United States Patent [19]

McLintic

[11] 3,944,320
[45] Mar. 16, 1976

[54] COLD-LIGHT MIRROR

[75] Inventor: William James McLintic, London, England

[73] Assignee: Thorn Electrical Industries Limited, London, England

[22] Filed: July 26, 1974

[21] Appl. No.: 492,345

[30] Foreign Application Priority Data
Aug. 9, 1973 United Kingdom............... 37842/73

[52] U.S. Cl. .................. 350/1; 240/41.3; 350/166; 350/290; 353/55
[51] Int. Cl.² .......................................... G02B 5/28
[58] Field of Search .......... 350/1, 166, 290; 240/47, 240/41.3; 353/55

[56] References Cited
UNITED STATES PATENTS

| | | | |
|---|---|---|---|
| 2,914,989 | 12/1959 | Gretener | 350/1 |
| 3,174,067 | 3/1965 | Bahrs | 350/1 X |
| 3,247,383 | 4/1966 | Ulseth et al. | 350/1 X |
| 3,645,601 | 2/1972 | Doctoroff et al. | 350/1 |
| 3,665,179 | 5/1972 | McLintic | 340/47 X |

*Primary Examiner*—John A. Corsin
*Attorney, Agent, or Firm*—Robert F. O'Connell

[57] ABSTRACT

A cold-light mirror, especially suitable in the form of an ellipsoidal or hyberbolic mirror for an optical system for forming a light beam, comprises a metal substrate covered with a pigmented vitreous layer for absorption of infra-red radiation which is transmitted by an overlying dielectric interference layer.

5 Claims, 5 Drawing Figures

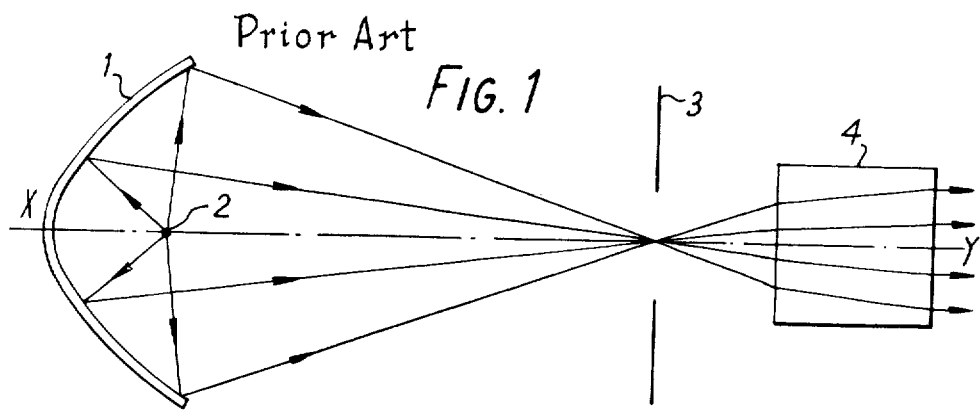
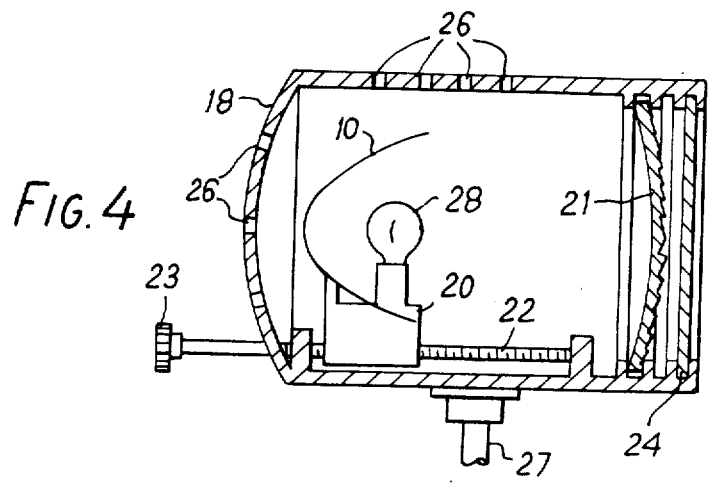
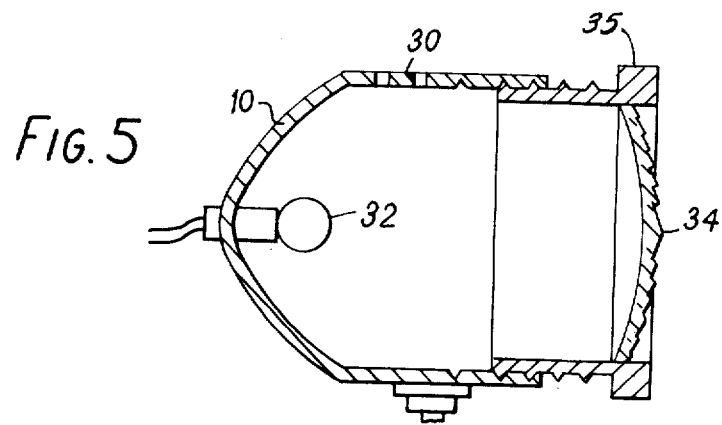

COLD-LIGHT MIRROR

This invention relates to an improved cold-light mirror suitable, inter alia, for beam-projection applications and for use in fibre optics systems.

In the production of optical systems for medical, theatrical, educational, and other purposes, involving the projection of high intensity light beams, a problem of some severity often arises in eliminating the harmful effect of infra-red radiation. For some years now use has been made of mirrors, known as cold-light mirrors, whose reflectance is restricted to limited wavelength bands. These produce the required intensity of light in the reflected beam, but with reduced infra-red content, as compared with reflected beams produced by ordinary metal mirrors.

The cold-light mirror at present in use has been described extensively in the technical literature. It usually consists of a transparent form or substrate, and one of its surfaces, namely the reflecting surface, bears a dielectric interference coating consisting of a series of thin films. The films are of alternate high and low refractive index, compared to that of the substrate, and of optical thickness equal to one quarter of the wavelength of the radiation for which high reflectance is desired. Reflectance is not particularly critical as to wavelength in such mirrors, and minor variations in the film thickness can easily result in high reflectance for the whole waveband of visible radiation. A series of about 20 films will have a reflectance of over 90 percent. Reflectance rapidly falls off as the wavelength of the radiation increases or diminishes beyond the visible waveband. The films and the substrate are effectively transparent to infra-red radiation and hence this radiation is transmitted through them. The required reflected beam is therefore depleted in infra-red radiation.

Prior cold-light mirrors have required substrates which are transparent to infra-red radiation. The available substrates have led to several disadvantages. Besides being transparent, the substrate has to be sufficiently rigid to maintain its shape and must also maintain its transparency under conditions of usage. Glass or other vitreous material is therefore normally required, and synthetic plastics materials are unsuitable. While vitreous materials are not in themselves expensive, shaping processes often are involved and costly, unless either vast production runs are warranted, or the shaped substrate can be of optically low grade. Present vitreous substrates are easily damaged in certain service applications where shock and vibration are unavoidable. Furthermore, the expansion of vitreous substrate materials with temperature can be a problem in designing a suitable mounting for the substrate in a light fitting. The substrate also absorbs and retains a considerable amount of heat when used with high powered sources, and problems of cooling the mounting or light fitting may arise.

The above problems could to a large extent be overcome if the substrate could be metallic. However, a metal substrate would not be able to transmit infra-red radiation, and furthermore would reflect the infra-red if its reflecting surface were specular.

We have found that a satisfactory cold-light mirror can be made using a metal substrate, if an appropriate absorber of infra-red radiation is employed. Accordingly, our present invention provides a cold-light mirror comprising a metal substrate, a pigmented vitreous coating on said substrate, the pigmented vitreous coating being capable of absorbing infra-red radiation and having a smooth glazed surface, and a dielectric interference coating on the said surface of the vitreous coating. The metal substrate can be of any desired shape, depending upon the optical properties required of the mirror. The substrate can be machined from solid metal or can be pressed, cupped, bent or spun to shape. The dielectric interference coating consists of a plurality of discrete layers of materials of differing refractive index, as is known in the art.

The pigmented vitreous coating is preferably a mixture of glass frit and a heat-resistant pigment of dark colouring. A suitable mixture is that commonly used for enamelling parts of fires, stoves and the like which are exposed to flames. The pigment in such a mixture produces a black vitreous enamel coating. In manufacturing a mirror embodying the invention, care has to be taken to ensure that the glaze of the pigmented vitreous coating is specular in order that the optical properties of the complete structure be unimpaired. This need arises from the fact that the layers of the interference coating are too thin to be able to remove surface irregularities which may exist on the surface upon which they are laid.

The invention will be described in more detail hereinafter by way of example with reference to the accompanying drawings, in which:

FIG. 1 is a schematic drawing of a projection system for 8 or 16 mm. film, employing a metal mirror;

FIG. 4 is an elevational view of a beam projector embodying the invention, and

FIG. 5 is a view similar to FIG. 4 of a modified beam projector embodying the invention.

A known film projection system as shown in FIG. 1 has a metal mirror 1 having a polished or specular reflecting surface. The mirror 1 is of substantially ellipsoidal form, and is centred upon the optical axis $x-y$ of the projector. At the first focus of the ellipsoid is a light source 2, and at or adjacent the second focus is a film gate 3. The mirror 1 concentrates reflected light upon a film (not shown) in the aperture of the gate 3. A projection lens 4 having a focal point located adjacent the gate produces an image of the film on a distant screen (not shown). Typical ray paths from the source are shown; both visible and infra-red radiation is emitted by the source 2 towards the mirror to be reflected towards the gate 3 and the projection lens 4. The film or transparency is thus subjected to a concentration of both light and heat.

Figure 2:
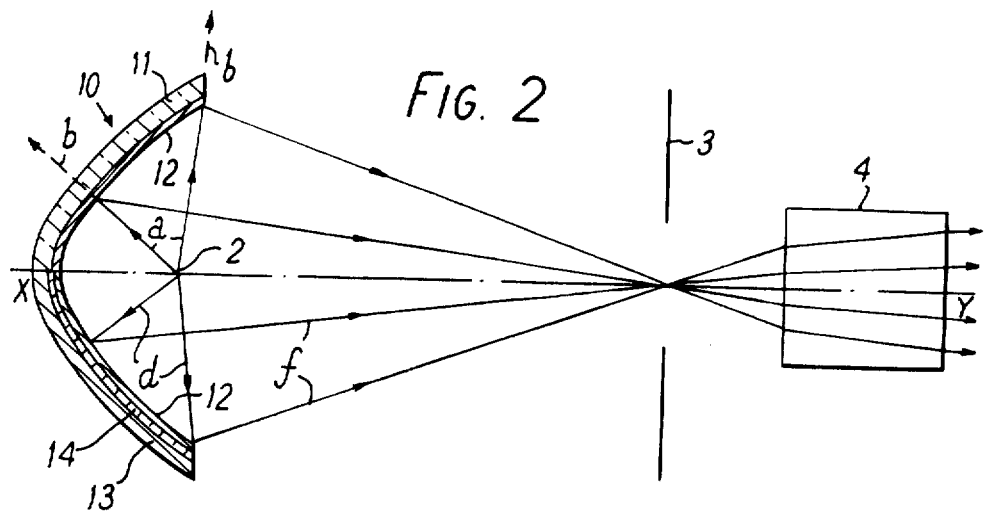
FIG. 2 is a schematic drawing of a similar projection system having a cold-light mirror which in the top half of the drawing is of conventional construction and in the lower half is constructed in accordance with the invention.

The system shown in FIG. 2 is similar to that shown in FIG. 1 except that now the mirror 10 is a cold-light mirror. The mirror 10, in the conventional construction shown in the top half of the drawing, has a substrate 11 of ellipsoidal form bearing a dielectric interference coating 12.

Prior art cold-light mirrors have a vitreous, e.g. glass, substrate which is transparent to infra-red radiation. The coating 12 is also transparent to infra-red radiation, but is reflective towards radiation in the visible waveband. Thus rays $a$, containing radiation of visible and infra-red wavelengths, incident upon the mirror 10 suffer a division of energy upon reflection. The infra-red radiation is transmitted through both the coating 12 and the substrate 11 following the rays $b$ and is not reflected forwardly towards the gate 3 and lens. Visible radiation, however, is reflected forwardly by the coating 12. The forwardly-reflected rays $c$ therefore have a diminished infra-red content. The gate 3, lens 4 and film are subjected to much decreased heating in this modified system compared with the basic system shown in FIG. 1, as can be tested by temperature measurements.

Figure 3:
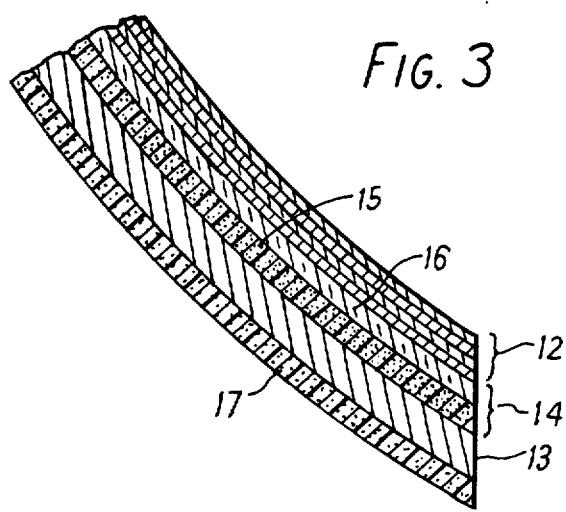
FIG. 3 is a partial, cross-sectional view through the cold-light mirror embodying the invention shown in the lower half of FIG. 2.

The system shown in FIG. 2 can employ an improved mirror 10 which embodies the invention and avoids the disadvantages, noted earlier, arising from the vitreous substrate just described. Thus, as shown in the lower half of FIG. 2, the mirror 10 has a metal substrate 13 provided with the coating 12 and with an intervening coating 14 which absorbs infra-red radiation. The structure of the present mirror is made more apparent by FIG. 3. The intervening coating 14 consists of a pigmented vitreous layer 15 lying against the metal substrate 13 and a non-pigmented layer 16 overlying the layer 15. The layer 15 is composed of a pigmented enamel similar to that used for enamelling parts of stoves upon which flames may play and comprising a mixture of glass frit and a black pigment. The coating 12 consists of a series of dielectric layers of alternating high and low refractive index. The thickness of each of the layers is approximately one quarter of the wavelength of the radiation which is to be reflected strongly. As many as twenty distinct layers may be needed. Since each layer must be of the order of 1500 Angstrom units thick, it will be appreciated that the scale of FIG. 3 is greatly exaggerated.

As with the cold-light mirror having a vitreous substrate, there is a division of energy upon reflection of rays incident upon the present mirror having a metal substrate. Rays $d$ emitted by the source 2 contain both visible and infra-red radiation. When these rays strike the dielectric interference coating 12, visible light wavelengths are reflected forwardly by appropriate layers of the coating. Infra-red radiation is not reflected forwardly by the coating 12, but instead is transmitted therethrough to the pigmented layer 15. The layer 15 absorbs the infra-red radiation and provided it is sufficiently dense, prevents significant forward reflection thereof by the metal substrate 13. The reflected rays $f$ have greatly diminished infra-red content.

Absorption of infra-red radiation by the pigmented layer 15 causes heating of the layer 15 and the substrate 13. This does not prove to be a difficult problem, however. It is quite a straightforward matter for the heat to be dissipated from the rear surface of the substrate, e.g. by natural air convection currents. If desired, the dissipation of heat can be aided by providing the rear of the substrate with a finned heat sink, or by forced draught cooling.

The substrate 13 can be made from a deformable metal sheet such as mild steel, aluminium or brass, by means of a pressing, cupping or spinning technique. Alternatively, the substrate can be turned from solid stock, e.g. from brass. The surface of the substrate to which the coatings 14 and 12 are to be applied, should be smooth, and may be polished. However, the degree of polish does not have to be specular as is required for the mirror 1 of FIG. 1.

The vitreous enamel layer 15 can be produced from a glass frit consisting of 60% $PbO$, 10% $B_2O_3$, 10% $SiO_2$, mixed with 20% $CoCr_2O_3$, $Fe_2O_3$ as a pigment. The frit and pigment mixture is doubly calcined and ground and suspended in water for spraying on to the substrate. Alternatively, the substrate is dipped into the suspension. After spraying or dipping, the coating is dried and then heated in a furnace or by direct flaming to glaze the frit and thereby produce a durable black adherent coating on the metal. To obtain a high quality specular finish for the coating 14, the second layer 16 of non-pigmented vitreous material is applied after firing of the layer 15. In this case an aqueous suspension of a pigment-free glass frit consisting of 70% $PbO$, 15% $B_2O_3$, 12% $SiO_2$, 3% $K_2O$, $Na_2O$ can be used.

The temperature coefficient of expansion of the enamel coating 14 should be sufficiently close to that of the metal of the substrate, to ensure that no distortion of the mirror occurs through heating when in operation, nor rupture of the coating 14. Some improvement of the smoothness of the optical surface of the substrate is obtained after the coating 14 has been glazed. It is preferable to have the opposite, rear surface of the substrate 13 left unpolished or to coat it with a pigmented vitreous enamel layer 17 which may be carried out at the same time as coating the front optical surface. The provision of a vitreous enamel backing layer 17 aids rearward radiation of heat from the substrate 13.

Since the vitreous enamel coating 14 has a glazed surface, the usual materials used for the coating 12 can be deposited directly thereon in the same way as upon a glass substrate. The adhesion of the coating 12 to the vitreous layer 16 is similar to that obtained when such a coating is applied to glass. Commonly used materials for the layers of the coating 12 are zinc sulphide and magnesium fluoride, or titanium dioxide and silicon dioxide, although other combinations can be used as is known.

Mirrors produced according to this invention are much more robust than those with glass substrates, and may have important advantages in terms of production cost. The metal substrate does not shatter under impact, and made of suitable materials will resist deformation from mechanical shock. Temporary and permanent mounting fixtures can be made more easily than for glass substrates and precision of alignment can be more simply achieved. One of the important advantages of mirrors embodying the invention is that their construction makes limited production runs and special purpose cold light mirrors a commercial proposition. The present improved cold light mirror has substantially no effect upon the colour of the visible portion of the incident radiation which it reflects.

The invention is not limited to the embodiment described above, but can be applied to systems for searchlights, fibre optical components, medical lighting apparatus, floodlighting and studio or theatre lighting, wherever heat problems can be solved by the use of cold light mirrors. One such application of the present mirror is in a beam projector as described in British Patent No. 1,208,960. This beam projector, a studio lighting fitting, is shown in the accompanying FIG. 4.

The fitting has a housing 18 within which there is a mirror 10 embodying this invention. The mirror 10 is of generally hyperbolic form, and its surface may be gently stippled or facetted, if "flood" lighting is required. The mirror 10 is carried by a combined mirror and source mounting 20 which is movable towards and away from a Fresnel-type lens 21. The mounting 20 has a threaded bore therethrough which co-operates with a lead screw 22. The lead screw 22 is rotatable and journalled between projections provided on the inner surface of the housing 18. A knob 23, accessible from the exterior of the housing 15 is provided to enable the lead screw 22 to be rotated for adjustment of the position of the mounting 20 relative to the lens 21. The housing 18 includes pairs of ribs which project inwardly of the housing, and provide a means for securing the lens 21 and an optional heat reflecting filter 24 to the housing. Apertures 26 are provided in the housing 18 for ventilation so that air can circulate between the interior and exterior of the housing for cooling purposes. A spigot 27 is fitted to the housing 18 so that the lamp assembly can be mounted on a stand or bracket (not shown). Maximum efficiency is obtained when compact sources are employed. Tungsten halogen lamps, with their characteristically small envelopes, and compact source discharge lamps are especially suitable for use in this beam projector. The source 28 illustrated in FIG. 4 is a tungsten-halogen filament lamp. The filament is located at the first focus of the mirror 10, so that a virtual image (not shown) of the filament is formed at the second focus of the mirror, that is behind the mirror. The virtual image is also at the focus of the Fresnel lens 21, which thus produces a substantially parallel beam of light. The source 28 is fixed relative to the mirror 10, and modification of the beam spread is obtained by adjusting the knob 23 to vary the position of mirror 10 and source 28 with respect to the lends 21.

Efficient cooling of the mirror 10 and source 28 can be promoted by providing the mounting 20 with cooling fins, not shown. Furthermore, a finned heat sink could be attached to the rear surface of the mirror 10.

A similar studio lighting fitting is shown in FIG. 5. where once again a cold light mirror 10 is employed having a metal substrate and an infra-red absorbing layer as described earlier. The mirror 10 is hyperboloidal and forms part of the housing 30 and is therefore fixed in relation to the housing 30. Source 32 is for example a tungsten halogen lamp, although a metal halide discharge lamp could be substituted, and is located at the first focus of the hyperboloidal mirror 10. A virtual image of the source is formed behind the mirror at the second focus thereof and this image is also substantially at the focus of the Fresnel lens 34, which produces a substantially parallel beam of light. The source 32 is fixed relative to the mirror, and modification of the beam spread is obtained by moving the lens 34 axially towards or away from the source 32. This movement is here obtained by mounting the lens 34 in a spiral-threaded mount 35 which cooperates with a spiral guide in the housing. The fitting shown in FIG. 5 successfully overcomes problems frequently encountered in studio lighting by minimizing the heat energy directed forwardly with the light beam. Also the production of heat within the housing 30 is removed by convection of air outwards through louvres or apertures in the housing 30. Not only does the mirror 10 remove a great amount of the heat energy in the light beam incident thereon, but also radiate freely and directly into the surrounding air since the mirror 10 is part of the external housing. The lighting fitting shown in FIG. 5 is thus particularly efficient.

I claim:

1. A cold-light mirror comprising a metal substrate having a front surface and a rear surface, a first pigmented vitreous coating on the front surface of said substrate and a second pigmented vitreous coating on the rear surface thereof, each of said pigmented vitreous coatings comprising a black vitreous enamel capable of absorbing infra-red radiation and having a smooth glazed surface, and a dielectric interference coating on the surface of said first pigmented vitreous coating for reflecting visible light and for transmitting infra-red radiation.

2. A cold-light mirror as claimed in claim 1 in which said first pigmented vitreous coating includes a layer of pigment-free vitreous material forming the said smooth glazed surface.

3. An optical system for forming a light beam comprising a conic section mirror and a light source positioned on the axis of the mirror, the mirror being a cold light mirror having a metal substrate with a front surface and a rear surface, a first pigmented vitreous coating on the front surface of said substrate and a second pigmented vitreous coating on the rear surface thereof, each of said pigmented vitreous coatings comprising a black vitreous enamel capable of absorbing infra-red radiation and having a smooth, glazed surface, and a dielectric interference coating on the surface of said first vitreous coating, the dielectric interference coating being formed to reflect visible light from the light source but to transmit infra-red radiation.

4. An optical system as claimed in claim 3 comprising a housing enclosing the light source, the metal substrate of the mirror forming part of the said housing.

5. An optical system as claimed in claim 3 in which the pigmented vitreous coating includes a layer of pigment-free vitreous material forming the said smooth glazed surface.

* * * * *